United States Patent [19]

Peleus

[11] Patent Number: 4,669,638
[45] Date of Patent: Jun. 2, 1987

[54] APPARATUS FOR CONTROLLABLY DISCHARGING POWDER AND/OR PELLETS FROM A HOPPER

[75] Inventor: Agne Peleus, Malmo, Sweden

[73] Assignee: Peleus & Co. KB, Malmo, Sweden

[21] Appl. No.: 687,247

[22] Filed: Dec. 28, 1984

Related U.S. Application Data

[63] Continuation-in-part of Ser. No. 471,444, Mar. 2, 1983, abandoned.

[51] Int. Cl.⁴ .............................................. B65D 88/66
[52] U.S. Cl. .................................... 222/200; 222/459;
   222/547; 198/533; 366/113
[58] Field of Search ............... 222/196, 199, 200, 459,
   222/547, 564; 366/108, 113, 114; 198/533

[56] References Cited

U.S. PATENT DOCUMENTS

| | | | |
|---|---|---|---|
| 1,606,733 | 11/1926 | Haiss | 222/503 X |
| 3,173,583 | 3/1965 | Wahl | 222/200 X |
| 4,131,193 | 12/1978 | Musscchoot | 198/533 |
| 4,285,447 | 8/1981 | Fairbank | 222/200 |

FOREIGN PATENT DOCUMENTS 1415721  11/1975  United Kingdom ............... 222/199

Primary Examiner—Joseph J. Rolla
Assistant Examiner—Frederick R. Handren
Attorney, Agent, or Firm—Fleit, Jacobson, Cohn & Price

[57] ABSTRACT

An apparatus for discharging powder and/or pellets from a hopper defining an outlet adjacent the base thereof. The apparatus includes a baffle associated with the outlet to control the rate of flow of said powder and/or pellets and a chute located under the baffle to receive the powder and/or pellets. The powder and/or pellets is discharged through an outlet from the chute. The baffle is vibrated substantially horizontally due to the dampening forces of the powder and/or pellets supported by the baffle.

5 Claims, 4 Drawing Figures

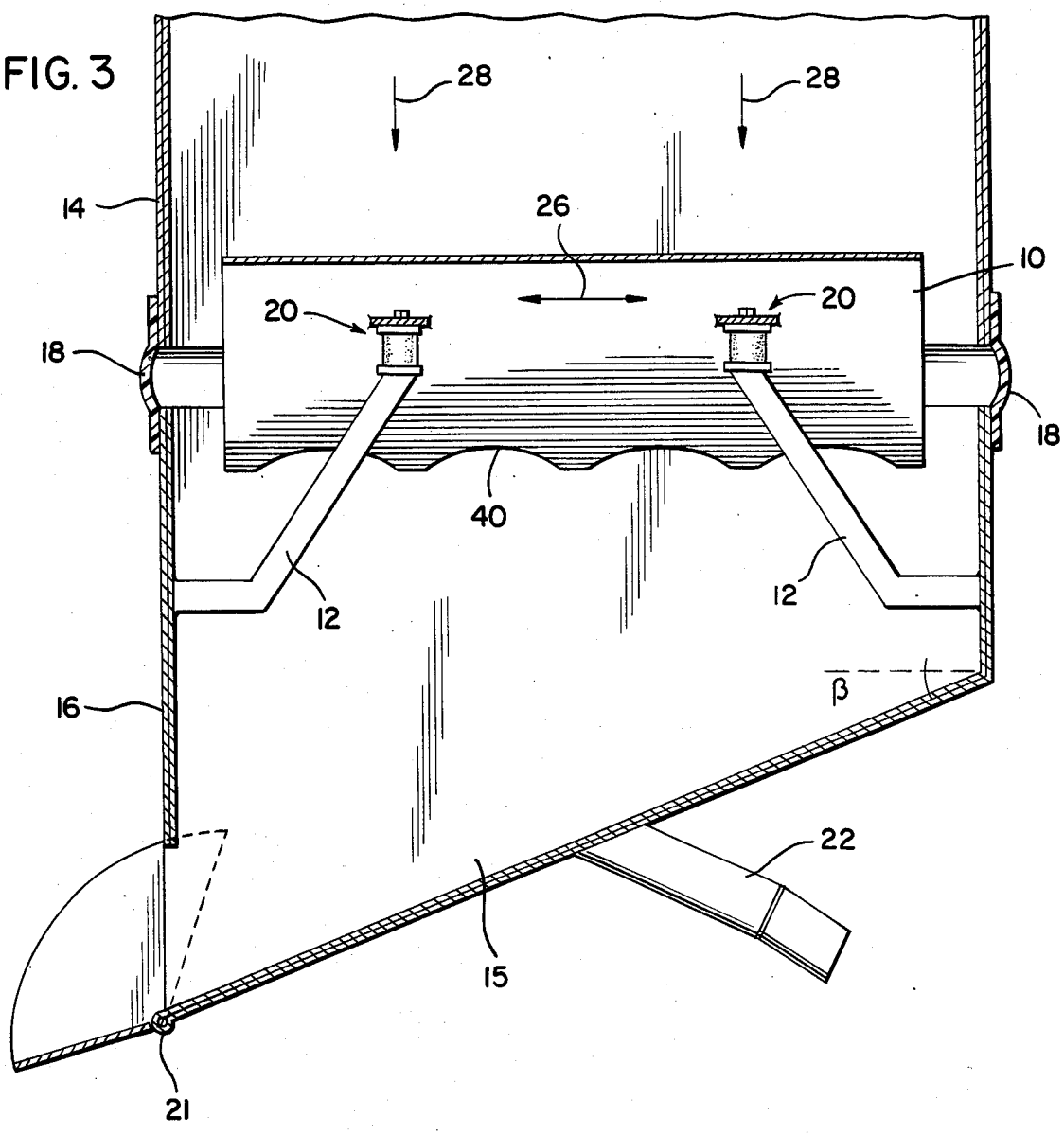
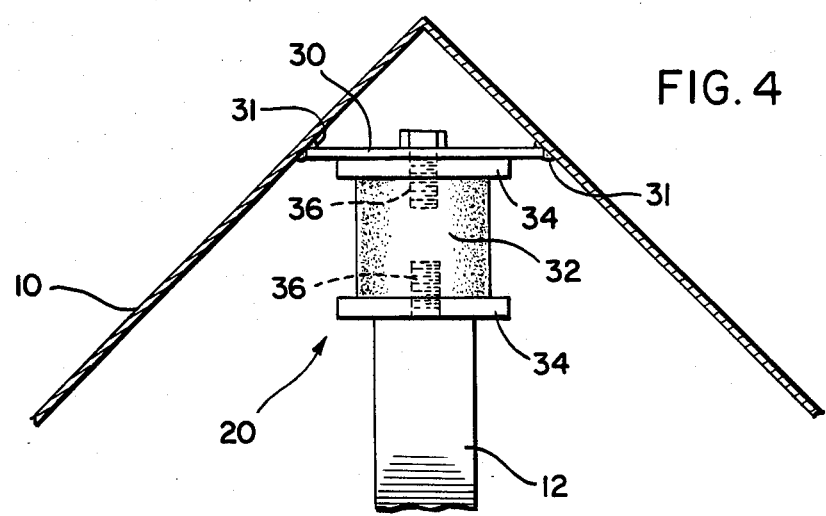

APPARATUS FOR CONTROLLABLY DISCHARGING POWDER AND/OR PELLETS FROM A HOPPER

This application is a continuation-in-part application of U.S. patent application Ser. No. 471,444, filed Mar. 2, 1983, now abandoned.

DESCRIPTION OF THE INVENTION

The present invention relates to an apparatus for controlling the discharge of powder and/or pellets from containers such as hoppers. In particular the invention relates to a device for use with a hopper having converging side walls located adjacent to the outlet through which the powder and/or pellets are discharged.

Conventionally, powder and/or pellets may be stored in large hoppers. Usually such hoppers have converging side walls at the base thereof, and these converging side walls converge towards an outlet. Frequently, a movable baffle is provided to control the rate of discharge of the powder and/or pellets, this baffle member being movable to a position in which it closes the opening defined between the converging side walls. The baffle may then be moved vertically to a position in which it is spaced from the side walls, thus permitting the powder and/or pellets to be discharged from the container. One disadvantage of this prior proposed arrangement is that the powder and/or pellets being discharged from the container inevitably impinge upon the baffle and thus effectively form two streams of discharging material. Frequently, these streams of discharging material are caused to flow in opposite directions.

The present invention provides an apparatus for discharging powder and/or pellets from a hopper defining an outlet adjacent the base thereof, said apparatus comprising a baffle associated with the outlet to control the rate of flow of said powder and/or pellets and a chute located under the baffle to receive the powder and/or pellets, there being an outlet from said chute through which the powder and/or pellets may be discharged.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a cross sectional view of the chute and hopper shown in FIG. 1, exposing a baffle; and FIG. 4 is an enlarged cross-sectional view of the baffle and connecting struts shown in FIG. 3.

DETAILED DESCRIPTION OF THE DRAWINGS

Figure 1:
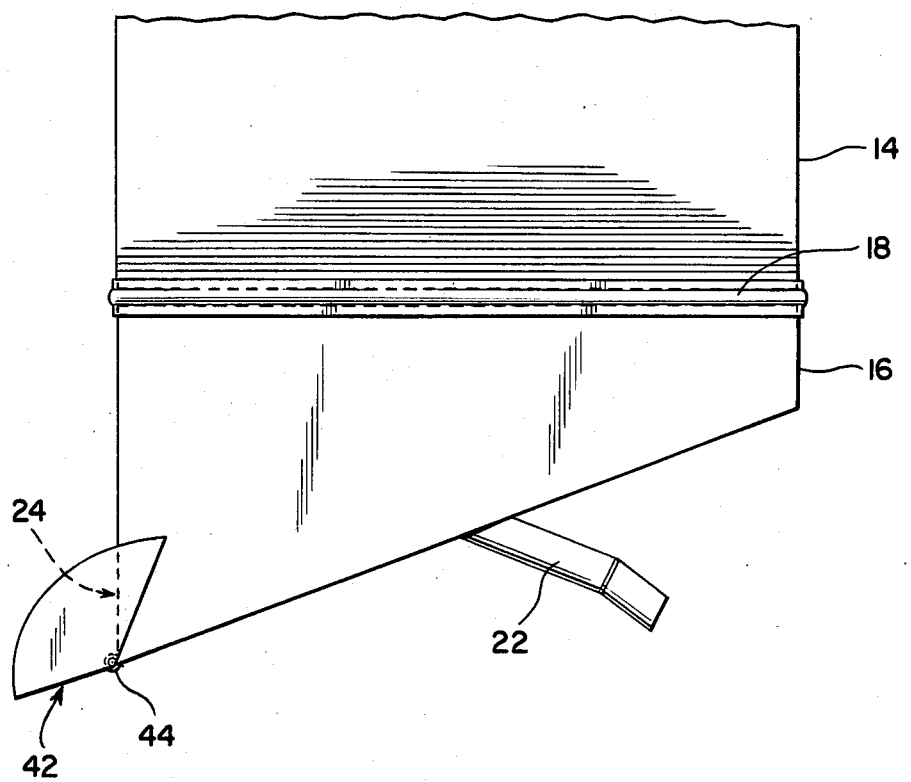
FIG. 1 is a side view of the exterior of a hopper, chute, vibrator and discharge outlet.

As shown in FIG. 1, hopper 14 is connected to chute 16 by resilient interconnecting strip 18. Vibrator 22 is connected to the bottom of the chute 16. Outlet 24 includes a pivotable discharge trough 42, pivoted about pivot point 44.

Figure 2:
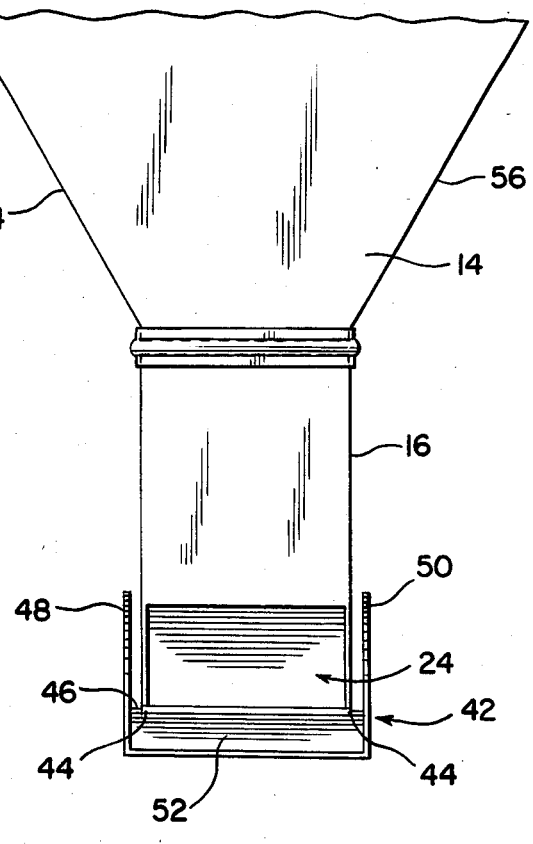
FIG. 2 is an end view of the hopper, chute and discharge outlet shown in FIG. 1.

In FIG. 2, discharge trough 42 is shown pivoting about pivot points 44 on rod 46. The discharge trough 42 includes two sides 48 and 50 located on opposite sides of the chute 16 and a discharge plate 52 located in front of and below the outlet 24. The hopper 14 includes converging side walls 54 and 56.

As shown in FIGS. 3 and 4, baffle 10 is suspended within the lower region of the hopper 14 and upper region of chute 16. The outlet defined by the hopper is an elongated, substantially rectangular outlet and the baffle is also elongated and is substantially rectangular. The sidewalls of the hopper converge towards each other to form the outlet. The hopper contains powder and/or granular material. The baffle 10 controls the discharge of the powder and/or granular materials from the bottom of the hopper 14 to the chute 16. The baffle 10 is constituted by two elongated plates, which may be perforated, that are interconnected to form an inverted apex, or possibly an inverted "U". The axis of the inverted apex is aligned with the longitudinal axis of the aperture defined between the side walls of the hopper.

Located immediately beneath the baffle 10 is a chute 16, which is vibrationally mounted. The chute 16 defines an elongated, substantially "U" section channel and the upper portions of the side walls of the channel are connected to the outlet formed by the side walls of the hopper 14 by resilient interconnecting strip 18. The base of the chute is provided with outlet 24 extending from the base of the channel member that defines the chute 16.

The hopper is mounted to be vibrated by a vibrator 22, secured to the bottom of the chute 16. Any suitable vibrating means may be used, for example, a pneumatically operated reciprocating piston arrangement. An electric vibrating means should be avoided to prevent explosion. Risk of an explosion is caused usually by ambient fumes and sometimes by the powder, or a combination of the powder with the ambient fumes. As the chute 16 is vibrated, struts 12 secured to the side wall of the chute 16 are also vibrated. Vibration transmitting assemblies 20 are located at the other end of the arms 12. The struts 12 are connected to the baffle 10 by the vibration transmitting assemblies 20.

The forces, shown by arrows 28, of the powder and/or granular material, located in the hopper 14 above the baffle 10, continuously act in the vertical direction on baffle 10. When the vibrator 22 is activated, the vibrations are transmitted from the chute to the struts and through the vibration transmitting assemblies to the baffle 10. As shown by arrow 26, the baffle is horizontally reciprocated within the powder and/or granular material located around the baffle 10. The horizontal movement of the baffle serves to cut bridges formed in the material and facilitates the constant vertical movement of the powder and/or granular material past the baffle 10.

The base portion 15 of the chute 16 diverges toward the outlet 24. The angle $\beta$, shown in FIG. 3, is most efficient at a pitch angle of 25° to the horizontal. However, pitch angles between 10° and 40° are acceptable. Material passing the baffle 10 is vibrated down into the chute 16 and exists from the outlet 24 via outlet conduit 42 located at one end of the chute 16. An even stream of powder and/or granular material is thus discharged through the outlet 24.

The baffle 10 supports the powder and/or granular material located in the hopper above the baffle. Thus, the weight of the material is not bearing down on the material located below the baffle 10. The material emerging from the chute and the vibration of the chute is thus less likely to cause an undesirable compacting, and possible jamming of the emerging material.

As shown in more detail in FIG. 4, the vibration transmitting assembly 20 includes a metal plate 30 welded at joints 31 to opposite plates of the baffle 10. Metal holding plates 34 are located at each end of a rubber bushing 32. Bolt 36 secures the top plate 34 to the plate 30. At the opposite end of the rubber bushing 32 is another holding plate 34 secured to strut 12 by another bolt 36. When the chute 16 is vibrated, strut 12 transmits the vibrations to the assembly 20 interconnecting the strut 12 and baffle 10. The baffle 10 vibrates with respect to the translational movement of the strut 12 in a horizontal direction as directed by the vertical forces of the powder and/or pellets supported by the baffle.

There is always a space located directly under the baffle which is free of powdered material. This space facilitates the freeflow of powdered material through the outlet 24 by allowing the vibrated material to shift upward momentarily into the space. The edges 40 of the baffle are irregularly shaped to break bridges in the powdered material. The baffle is spaced from the side walls of the hopper 14 and chute 16 to allow for the horizontal vibrational movement of the baffle 10.

The design of the present invention allows easy access to the hopper and baffle for maintenance and cleaning by the removability of the resilient connecting strip 18 from the hopper and chute.

While the invention has been described with reference to specific preferred embodiments it is to be appreciated that many modifications or improvements can be made without departing from the scope of the invention.

I claim:

1. An apparatus for discharging powder and/or pellets, said apparatus comprising:
   a hopper including an outlet;
   an elongated baffle located in said hopper adjacent to said outlet for controlling the rate of flow of said powder and/or pellets, said baffle including two substantially flat plates which abut along their longitudinal edges and incline downwardly and outwardly from their abutting edges;
   a chute located under the baffle for receiving the power and/or pellets flowing from said hopper;
   two struts, at least one of said two struts having one end rigidly fixed to the chute;
   resilient means interconnecting the other end of each of said two struts and the baffle for transmitting vibrational movement from said stuts to said baffle so that bridges formed in said powder and/or pellets between said baffle and said hopper are cut by the vibrational movement of said baffle, said resilient means being located and supporting said baffle directly beneath said abutting edges,
   vibrating means mounted on said chute for vibrating the chute and horizontally vibrating said baffle in a direction substantially parallel to a longitudinal axis of said baffle to cut said bridges, said baffle remaining substantially stationary in a vertical direction due to a vertical dampening force of the powder and/or pellets supported by the baffle; and
   an outlet defined by said chute for discharging the powder and/or pellets which has flowed from said hopper into said chute.

2. An apparatus for discharging powder and/or pellets as claimed in claim 1, wherein said resilient means comprises a rubber bushing.

3. An apparatus for discharging powder and/or pellets as claimed in claim 1, wherein said outlet defined by said hopper is an elongated, substantially rectangular outlet and said baffle is an elongated substantially rectangular baffle.

4. An apparatus for discharging powder and/or pellets as claimed in claim 1, wherein the hopper and the chute are interconnected by resilient sealing means.

5. An apparatus for discharging powder and/or pellets as claimed in claim 1, wherein the baffle is shaped with irregular edges.

* * * * *